(12) United States Patent
Wyatt

(10) Patent No.: US 8,042,322 B1
(45) Date of Patent: Oct. 25, 2011

(54) SINGLE SHAFT DRIVEN MULTIPLE OUTPUT VEHICLE

(75) Inventor: Christopher K. Wyatt, Windsor, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 11/830,245

(22) Filed: Jul. 30, 2007

(51) Int. Cl.
*A01D 34/00* (2006.01)

(52) U.S. Cl. ................... 56/16.9; 56/6; 56/11.9

(58) Field of Classification Search .............. 56/6, 11.9, 56/13.5–13.8, 14.7, 16.7, 16.9; 310/80, 83
See application file for complete search history.

(56) References Cited

U.S. PATENT DOCUMENTS

| | | | |
|---|---|---|---|
| 493,942 A * | 3/1893 | Philipsborn | 105/55 |
| 1,716,085 A | 6/1929 | Perkins | |
| 2,504,365 A | 4/1950 | Wallace | |
| 2,547,328 A * | 4/1951 | Koch et al. | 56/12.9 |
| 2,618,919 A | 11/1952 | Hutchens | |
| 2,625,784 A | 1/1953 | Kelsey | |
| 2,682,740 A | 7/1954 | Miller et al. | |
| 2,753,674 A | 7/1956 | Cunningham, Jr. et al. | |
| 2,787,881 A | 4/1957 | McDaniel | |
| 2,826,129 A * | 3/1958 | Olson | 172/38 |
| 2,851,143 A | 9/1958 | Rosetz | |
| 2,986,864 A * | 6/1961 | Young | 56/503 |
| 3,362,753 A | 1/1968 | Sibley | |
| 3,596,444 A | 8/1971 | Beattie | |
| 3,802,002 A | 4/1974 | Jonas | |
| 4,105,372 A | 8/1978 | Mishina et al. | |
| 4,126,989 A | 11/1978 | Oosterling et al. | |
| 4,130,065 A | 12/1978 | Susdorf et al. | |
| 4,130,172 A | 12/1978 | Moody | |
| 4,274,023 A | 6/1981 | Lamprey | |
| 5,007,234 A | 4/1991 | Shurman et al. | |
| 5,040,429 A | 8/1991 | Del Castillo | |
| 5,443,130 A | 8/1995 | Tanaka et al. | |
| 5,457,363 A | 10/1995 | Yoshii et al. | |
| 5,532,535 A | 7/1996 | Oltmanns | |
| 5,572,856 A * | 11/1996 | Ku | 56/10.2 A |
| 5,631,511 A | 5/1997 | Schulmann et al. | |
| 5,794,422 A * | 8/1998 | Reimers et al. | 56/11.9 |
| 5,794,622 A | 8/1998 | Chopp et al. | |
| 6,122,996 A | 9/2000 | Hauser et al. | |
| 6,312,352 B1 | 11/2001 | Holland et al. | |
| 6,318,496 B1 | 11/2001 | Koehler et al. | |
| 6,591,593 B1 | 7/2003 | Brandon et al. | |

* cited by examiner

*Primary Examiner* — Alicia Torres
(74) *Attorney, Agent, or Firm* — Neal, Gerber & Eisenberg LLP

(57) ABSTRACT

A vehicle comprising a frame with an electric power source secured to the frame. The vehicle further comprises an electric motor driven by the electric power source and secured to a deck and having at least a first side and a second side formed opposite the first side. The vehicle has a first shaft located within the electric motor housing and driven by the electric motor, the first shaft has a first end, which extends from the electric motor housing first side, and a second end, which extends from the electric motor housing second end. The vehicle further comprises a first output assembly driven by the first end of the first shaft and a second output assembly driven by the second end of the first shaft.

13 Claims, 3 Drawing Sheets

SINGLE SHAFT DRIVEN MULTIPLE OUTPUT VEHICLE

BACKGROUND OF THE INVENTION

This invention relates to vehicles, in particular, vehicles having multiple outputs driven by a single shaft.

SUMMARY OF THE INVENTION

A vehicle having multiple outputs driven by a single shaft is disclosed herein. The details of the invention are set forth below in connection with the detailed description of the embodiments.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
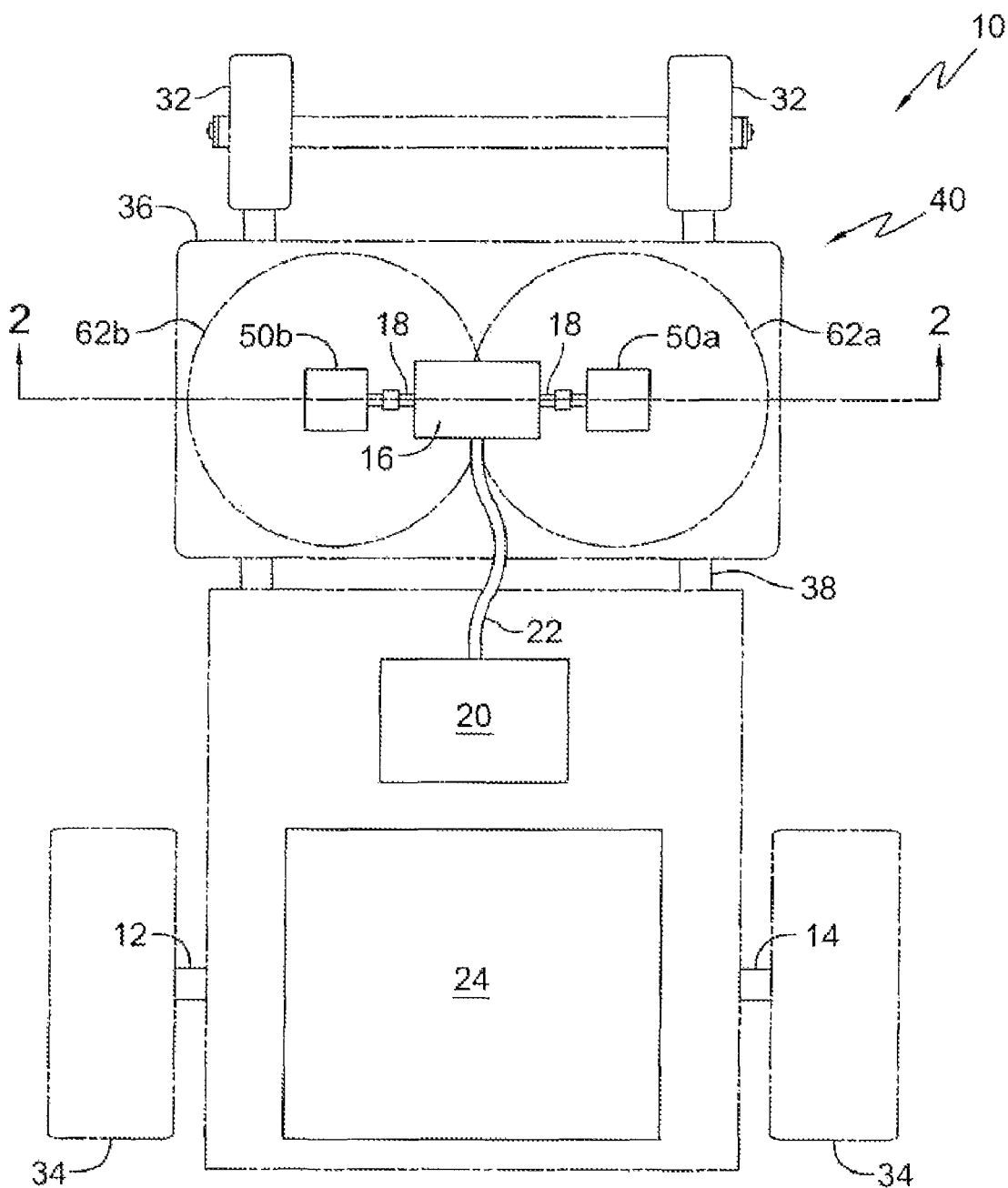
FIG. 1 is a top view of a first embodiment of the present invention.

Turning now to the figures, where like reference numerals refer to like elements, there is illustrated in FIG. 1 an exemplary vehicle 10, having a pair of driving wheels 34 and a pair of steering wheels 32. Vehicle 10 is driven by prime mover 24, which is attached to frame 38 of vehicle 10. Prime mover 24 may be drivingly connected by way of a transmission (not shown) to driving wheels 34 through axle shafts 12 and 14. One such type of transmission may be a hydrostatic transmission. Hydrostatic transmissions are well-known throughout the industry and therefore will not be discussed in detail. The elements of a typical hydrostatic transmission are described in more detail in U.S. Pat. No. 6,122,996, which is incorporated herein by reference. Also, it will be appreciated by those in the art that the scope of the present invention includes a vehicle such as vehicle 10 that is driven by any known means other than a hydrostatic transmission, such as a mechanical transmission, an electric motor or a hydraulic motor.

Vehicle 10 also comprises output 40. In the depicted embodiment, output 40 is a mower deck, although it will be appreciated in the art that the scope of the present invention includes various other types of outputs.

Figure 2:
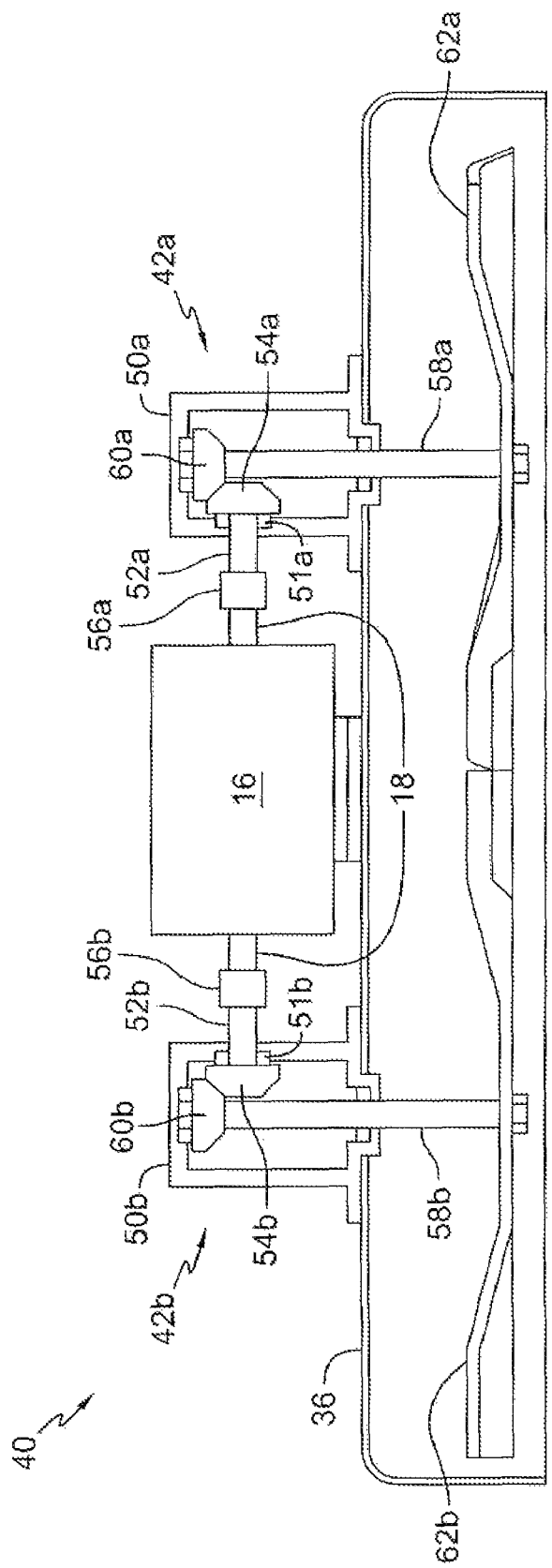
FIG. 2 is a view along the lines 2-2 in FIG. 1.

As seen in FIGS. 1 and 2, output 40 comprises electric motor 16, which is attached to deck 36. Single shaft 18 extends from opposing sides of electric motor 16. Electric motor 16 is powered by electric power source 20, which is secured to vehicle 10. Electric power source 20 is attached to the electric motor by wire 22. Electric power source 20 may be a battery, generator, or any other known means of power generation, all of which are well known in the art. Moreover, electric motors, such as electric motor 16, are also well known in the industry. As such, the specific features of both electric power source 20 and electric motor 16 are not discussed in detail herein.

As seen most clearly in FIG. 2, output 40 further comprises a pair of output assemblies 42a and 42b. In the depicted embodiment, the elements of output assemblies 42a and 42b are generally identical, and only output assembly 42a will be described in detail. However, it will be appreciated that the description of output assembly 42a will apply equally to the description of the elements of output assembly 42b. Furthermore, it will also be obvious that the scope of the present invention includes an embodiment in which the elements of output assemblies 42a and 42b are not identical.

Output assembly 42a comprises gear housing 50a, which is located on and secured to deck 36. Input shaft 52a is rotatably secured in gear housing 50a. In the depicted embodiment, input shaft 52a is secured in gear housing 50a by bearing 51a, but it will be appreciated that the scope of the present invention includes any known means of rotatably securing input shaft 52a. Input bevel gear 54a is secured to input shaft 52a at a first end thereof. The second end of input shaft 52a extends from gear housing 50a and is coupled to and driven by single shaft 18 at a first end thereof. Coupler 56a couples the second end of input shaft 52a with the first end of single shaft 18.

Output shaft 58a is also rotatably secured within gear housing 50a. Output bevel gear 60a is located at the first end of output shaft 58a. Output bevel gear 60a is engaged to and driven by input bevel gear 54a.

The second end of output shaft 58a extends from gear housing 50a into deck 36. Mower blade 62a is located within deck 36 and attached to and driven by the second end of output shaft 58a.

Figure 3:
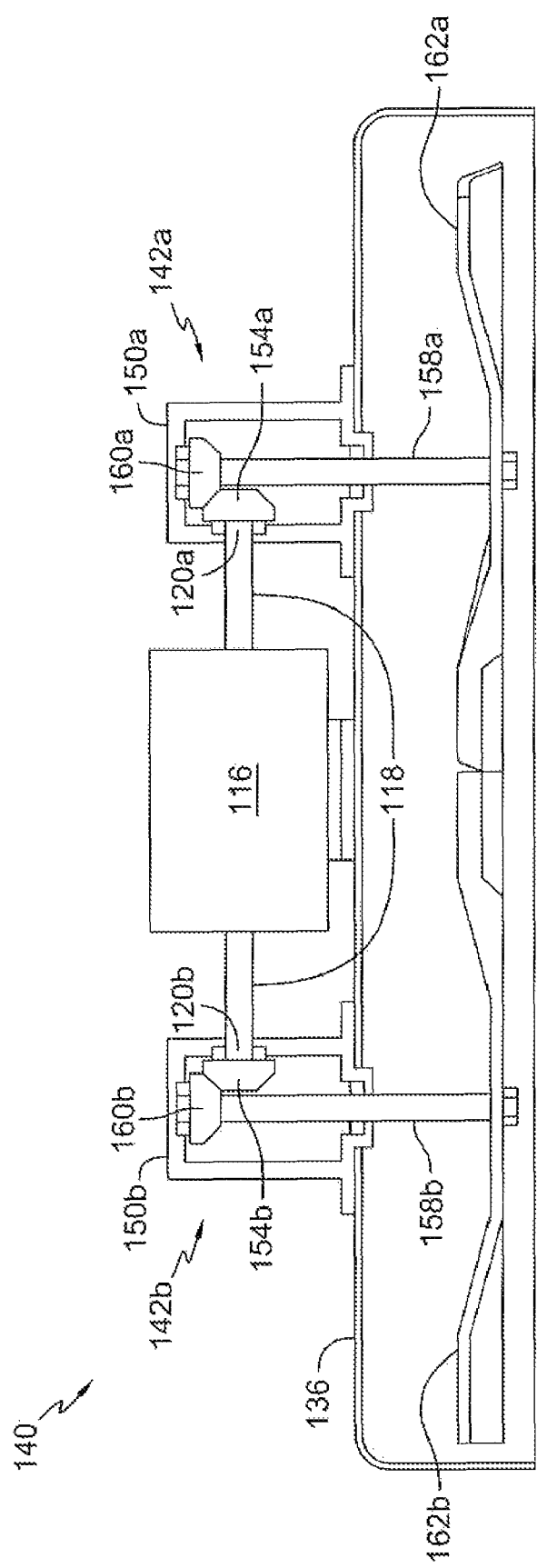
FIG. 3 is a view of a second embodiment of the present invention.

A second embodiment of the present invention is disclosed in FIG. 3. In the second embodiment, single shaft 118 extends from opposing sides of electric motor 116. As seen, single shaft 118 comprises a first end 120a, which extends into gear housing 150a, and a second end 120b, which extends into gear housing 150b. As in the first embodiment, the depicted second embodiment includes identical elements in output assemblies 142a and 142b, and therefore, only output assembly 142a will be described in detail. It will also be obvious that the scope of the present invention includes an embodiment in which the elements of output assemblies 142a and 142b are not identical.

Input bevel gear 154a is secured to first end 120a. Output shaft 158a is rotatably secured within gear housing 150a. Output bevel gear 160a is located at the first end of output shaft 158a. Output bevel gear 160a is engaged to and driven by input bevel gear 154a.

The second end of output shaft 158a extends from gear housing 150a into deck 136. Mower blade 162a is located within deck 136 and attached to and driven by the second end of output shaft 158a.

Note that, as viewed in FIGS. 2 and 3, mower blade 62b overlaps mower blade 62a and mower blade 162b overlaps mower blade 162a. Because a single shaft, either single shaft 18 or single shaft 118, drives the mower blades, the orientation of mower blade 62b or mower blade 162b with respect to mower blade 62a or mower blade 162a may be fixed so that, for example, when mower blade 62b is positioned as shown in FIG. 2 mower blade 62a will be oriented at an angle with respect to mower blade 62b. Fixing the orientation of mower blade 62b or 162b with respect to mower blade 62a or 162a allows the two mower blades to mesh. Mesh in this context means to travel at least partially in the same volume or space without danger of the blades striking each other. Mower blades driven by belts or by separate drive motors cannot be configured to guarantee a specific orientation of two blades with respect to each other because, for example, belts may slip, or synchronization of two different motors is difficult or impossible to maintain, and thus meshing is not permitted. Designs where mower blades are driven by belts or by separate motors position the blades so that the blades appear to overlap when viewed from the side, but the blades are actually offset from each other to prevent the blades from meshing.

In the embodiments shown, the left mower blade will move in an opposite direction of rotation from the right mower blade. A person having ordinary skill in the art will recognize that the bevel gears in one of the output assemblies may be repositioned to permit the left mower blade and the right mower blade to move in the same direction of rotation. Thus, varying orientations of bevel gears is anticipated as an obvious variation of the present invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A vehicle capable of operating in at least a first direction of travel, the vehicle comprising:
    a frame;
    an electric power source secured to the frame;
    an electric motor driven by the electric power source and positioned within an electric motor housing, the electric motor housing secured to a deck and comprising at least a first lateral side parallel to the first direction of travel, and a second lateral side parallel to the first direction of travel and formed opposite the first lateral side;
    a motor shaft located within and extending through the electric motor housing, the motor shaft driven by the electric motor and comprising a first end, which extends from the first lateral side of the electric motor housing, and a second end, which extends from the second lateral side of the electric motor housing;
    a first output shaft driven by the first end of the motor shaft, the first output shaft positioned external to the electric motor housing and perpendicular to the motor shaft;
    a second output shaft driven by the second end of the motor shaft, the second output shaft positioned external to the electric motor housing and perpendicular to the motor shaft;
    a first mower blade having a first mower blade axis of rotation and driven by the first output shaft; and
    a second mower blade having a second mower blade axis of rotation and driven by the second output shaft,
    wherein the first mower blade axis of rotation and the second mower blade axis of rotation are perpendicular to the axis of rotation of the motor shaft; and wherein the first mower blade and the second mower blade are meshed and have a fixed orientation with respect to each other.

2. The vehicle as set forth in claim 1, further comprising a first output assembly comprising:
    a first gear box secured to the deck; and
    a first input shaft having a first end, which extends from the first gear box and engages the first end of the motor shaft, and a second end comprising a first input bevel gear attached thereto;
    the first output shaft having a first end, which extends from the first gear box through the deck, and a second end comprising a first output bevel gear attached thereto, wherein the first input bevel gear is engaged to the first output bevel gear.

3. The vehicle as set forth in claim 2, further comprising a second output assembly comprises:
    a second gear box secured to the deck; and
    a second input shaft having a first end, which extends from the second gear box and engages the second end of the motor shaft, and a second end comprising a second input bevel gear attached thereto;
    the second output shaft having a first end, which extends from the second gear box through the deck, and a second end comprising a second output bevel gear attached thereto, wherein the second input bevel gear is engaged to the second output bevel gear.

4. The vehicle as set forth in claim 1, wherein the electric power source is a battery.

5. The vehicle as set forth in claim 1, wherein the electric power source is a generator.

6. The vehicle as set forth in claim 1, further comprising a prime mover for driving the vehicle, wherein the first mower blade and the second mower blade are driven solely by the electric motor.

7. A vehicle capable of operating in at least a first direction of travel, the vehicle comprising:
    a frame having a deck attached thereto;
    a prime mover disposed on the frame;
    a pair of driving wheels attached to the vehicle and driven by the prime mover;
    a pair of steering wheels attached to the vehicle;
    an electric power source disposed on the vehicle;
    an electric motor powered by the electric power source and disposed in an electric motor housing disposed on the deck, the electric motor housing having a first lateral side, formed parallel to the first direction of travel, and a second lateral side, formed parallel to and opposite the first lateral side;
    a motor shaft driven by the electric motor and having a first end extending from the first lateral side of the electric motor housing and a second end extending from the second lateral side of the electric motor housing, the motor shaft having a motor shaft axis of rotation that is parallel to the deck;
    a first output shaft having a proximal end engaged to and driven by the first end of the motor shaft, and a distal end that extends through the deck, the first output shaft positioned external to the electric motor housing and having an axis of rotation that is perpendicular to the axis of rotation of the motor shaft axis of rotation; and
    a second output shaft having a proximal end engaged to and driven by the second end of the motor shaft, and a distal end that extends through the deck, the second output shaft positioned external to the electric motor housing and having an axis of rotation that is perpendicular to the axis of rotation of the motor shaft axis of rotation; a first mower blade attached to the distal end of the first output shaft; a second mower blade attached to the distal end of the second output shaft; and wherein the first mower blade and the second mower blade are meshed and have a fixed orientation with respect to each other.

8. The vehicle as set forth in claim 7, wherein the first mower blade and the second mower blade travel at least partially in a common space.

9. The vehicle as set forth in claim 7, wherein the first mower blade and the second mower blade rotate in opposite directions.

10. The vehicle as set forth in claim 7, wherein the first mower blade and the second mower blade rotate in a plane, and wherein the axis of rotation of the first output shaft and the axis of rotation of the second output shaft are perpendicular to the plane and to the axis of rotation of the motor shaft.

11. The vehicle as set forth in claim 7, wherein the first mower blade and the second mower blade are driven solely by the electric motor.

12. The vehicle as set forth in claim 7, further comprising a first input bevel gear attached to the first end of the motor shaft, the first input bevel gear engaged to and driving a first output bevel gear attached to the proximal end of the first output shaft.

13. The vehicle as set forth in claim 12, further comprising a second input bevel gear attached to the second end of the motor shaft, the second input bevel gear engaged to and driving a second output bevel gear attached to the proximal end of the second output shaft.

* * * * *

UNITED STATES PATENT AND TRADEMARK OFFICE
CERTIFICATE OF CORRECTION

| | |
|---|---|
| PATENT NO. | : 8,042,322 B1 |
| APPLICATION NO. | : 11/830245 |
| DATED | : October 25, 2011 |
| INVENTOR(S) | : Christopher K. Wyatt |

It is certified that error appears in the above-identified patent and that said Letters Patent is hereby corrected as shown below:

At column 4, lines 44-45, and column 4, line 50-51, "an axis of rotation that is perpendicular to the axis of rotation of the motor shaft axis of rotation" should be amended to read --an axis of rotation that is perpendicular to the motor shaft axis of rotation--.

Signed and Sealed this
Twentieth Day of November, 2012

David J. Kappos
*Director of the United States Patent and Trademark Office*